Dec. 4, 1934.   P. WARD   1,983,256
COMBINATION TOOL
Filed June 9, 1934

Inventor
Paul Ward

Patented Dec. 4, 1934

1,983,256

UNITED STATES PATENT OFFICE 1,983,256

COMBINATION TOOL

Paul Ward, Nashville, Tenn.

Application June 9, 1934, Serial No. 729,934

6 Claims. (Cl. 12—17)

This invention relates to tools and more particularly to tools designed for trimming and waxing the edges of shoe soles and heel lifts. A particular object of the invention is to provide a combination tool comprising a rotary trimmer and a rotary waxer or finisher, one of the features of the invention being the provision of a pair of gages mounted upon the tool head and cooperating with the trimmer and with the waxer which gages are simultaneously adjustable by a single operating mechanism for varying their setting.

Another object of the invention is the provision of a novel form of cutting blade for the trimmer and the provision of a simple and convenient means for detachably mounting the cutting blades in the trimmer. A still further object of the invention is to provide a waxer of improved construction.

The present application is a substitute for my abandoned application Serial No. 677,130, filed June 22, 1933, in so far as the subject matter is disclosed therein.

The invention will be better understood from the following detailed description of a preferred embodiment thereof, reference being had to the annexed drawing in which.

Figure 1:
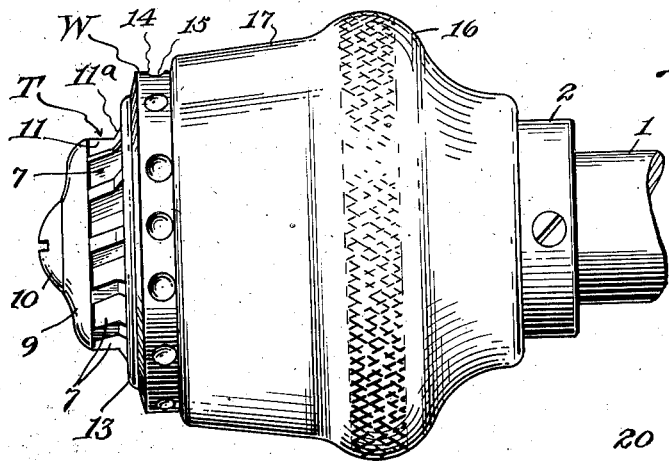
Figure 1 is a view of the tool in side elevation.

The tool illustrated in the drawing is particularly useful in shoe manufacture for trimming and waxing the edges of the shoe soles and heel lifts.

Figure 2:
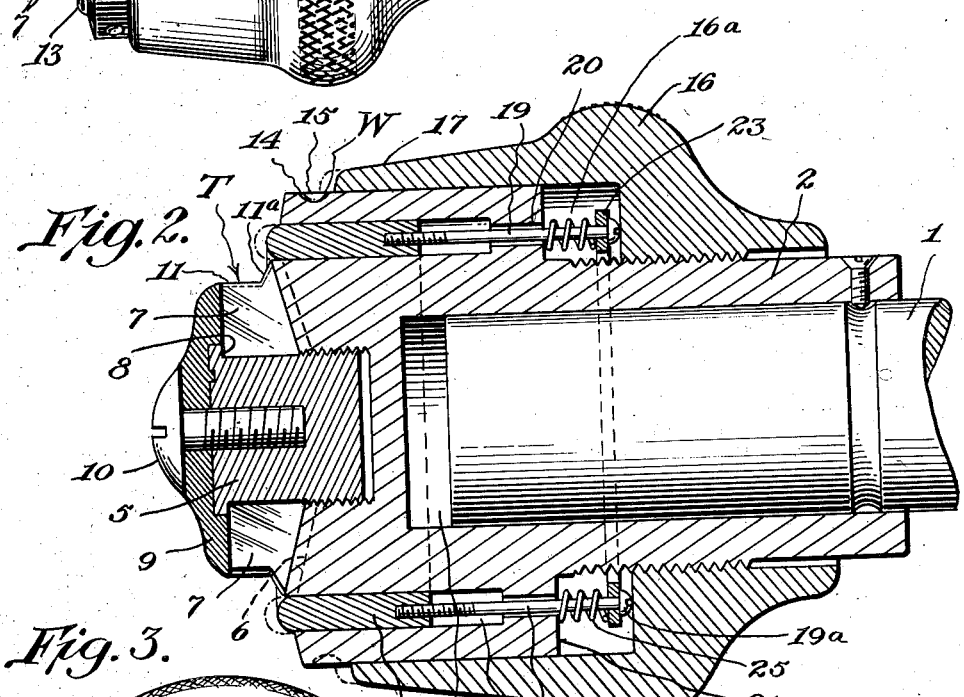
Figure 2 is a sectional view of the tool shown in Fig. 1.
Figure 3:
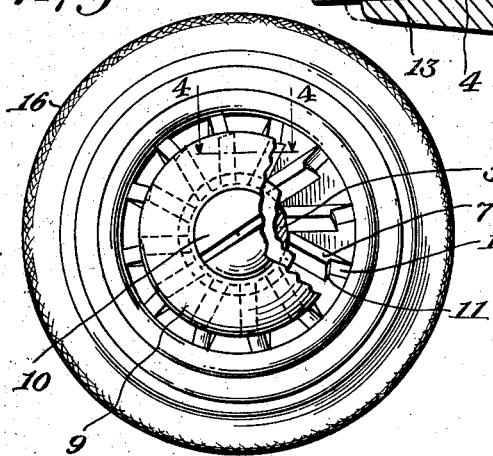
Figure 3 is an end elevation of the tool.

Referring to the figures, reference numeral 1 indicates the end of a rotatable shaft upon which the tool head 2 is mounted. The head comprises a trimmer T and a waxer W and is provided with a socket 4 for receiving the end of the shaft 1 as shown in Fig. 2. A cylindrical plug 5, threadedly mounted within the end of the tool head 2, supports a series of cutting knives 7 at spaced points about its circumference.

Figure 4:
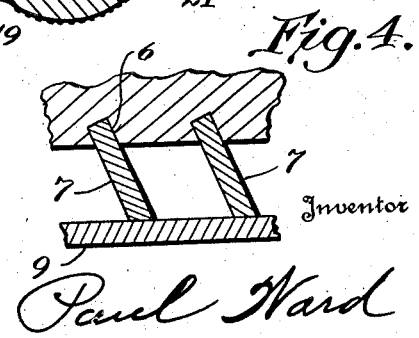
Figure 4 is a detail view taken on the line 4—4 of Fig. 3 showing the manner in which the blades are secured in the trimmer.

The knives 7 are of generally wedge shape and are received within overhanging grooves 6 formed in the end of the head 2. These blades are skewed or disposed at an angle to the axis of the head as shown in Figures 1 and 4 and are retained in their grooves by means of a flange 8 on the end of the plug 5. A guard cap 9 held by a screw 10 threaded into the end of plug 5 covers the outer edge of the blades. Each of these blades upon its working edge is provided with a straight section 11 and a terminal beveled section 11a which latter imparts a chamfer to the work being operated upon. The blades may be removed by taking off the guard cap 9 and backing off the plug 5 far enough to permit the withdrawal of the blades from the overhanging grooves 6.

The outer or operating end of the tool head is enlarged as shown in Fig. 2 and provided with a circular recess 12 within which is slidably fitted a cylindrical ring 13 constituting a gage for the trimmer T. The end of the head upon its exterior serves as the waxer W and is constituted of a smooth friction cylinder 14 provided at circumferentially spaced intervals with a series of circular cup-shaped depressions 15 for containing a wax.

These circular cup-shaped depressions in the operation of the waxer have a tendency to draw together the fibres of the leather of the shoe sole or heel lift. A sleeve 16 is threadedly mounted upon the smaller shank portion of the head and is adjustable by rotation therealong. The end of this sleeve is provided with an enlarged inside diameter providing a recess 16a for enclosing the end of the tool head and constituting a gage 17 for the waxer W.

In the normal operation of the tool, the shoe being operated upon will be presented first to the trimmer and then to the waxer. In order that the adjustment of the trimmer gage and waxer gage may be effected simultaneously and to the same extent, pins 19 are fastened into the end of the cylindrical ring 13 located within the recess 12 and these pins extend through openings 20 and project into the recess 16a above the ledge 21 defining the face connecting the reduced and the enlarged sections of the head. The pins 19 extend through openings in a ring 23 surrounding the smaller circumference of the tool head. The pins are provided with heads 19a, and coil springs 25 bear at one end against the ledge 21 and at the other end against the ring 23 so as to hold the pin heads in engagement with the bottom of the recess 16a defined by the sleeve 16. By this arrangement when the sleeve 16a is rotated along the threads upon the tool head to adjust the position of the waxer gage 17, the trimmer gage 13 is simultaneously adjusted. In the left hand travel of the sleeve 16 the trimmer gage 13 is positively moved forward by reason of the engagement of the bottom of the recess 16a of the sleeve 16 with the pin heads 19a; while in the right hand, or retractive, movement of the sleeve the gage 13 is restored by the springs to a position limited by contact of the pin heads 19a with the bottom of the recess.

I claim:

1. A combined trimmer and waxer comprising a head mounted upon a rotatable drive shaft, a series of cutting blades circumferentially spaced about the head, a cylindrical work-engaging surface provided with a plurality of depressions adapted to contain wax, a gage adjacent said cutting blades and a gage adjacent said cylindrical work-engaging surface, and means operable for simultaneously adjusting both of said gages to vary the extent of the work presentable to the cutting blades and to the work-engaging surface.

2. A combination tool comprising a head adapted to be mounted upon a rotatable drive shaft, a trimmer and waxer located at spaced intervals along said head, said trimmer comprising a series of cutting blades circumferentially spaced about the head and said waxer comprising a friction cylinder located adjacent said trimmer, an adjustable gage for said trimmer and an adjustable gage for said waxer adapted to limit the approach of the work to said trimmer and waxer respectively, and means for simultaneously adjusting these two gages.

3. A combination tool comprising a head adapted to be mounted upon a rotatable drive shaft, a trimmer and a waxer located at spaced intervals along said head, said trimmer comprising a series of cutting blades circumferentially spaced about the head and said waxer comprising a friction cylinder located adjacent said trimmer, an adjustable gage for said trimmer and an adjustable gage for said waxer adapted to limit the approach of the work to said trimmer and waxer respectively, said gages being displaceable longitudinally of the head, the arrangement being such that movement of one of the gages imparts movement to the other gage, and means for adjusting one of said gages.

4. A combination tool comprising a head adapted to be mounted upon a rotatable drive shaft, a trimmer and a waxer located at spaced intervals along said head, said trimmer comprising a series of cutting blades circumferentially spaced about the head and said waxer comprising a friction cylinder located adjacent said trimmer, an adjustable gage for said trimmer and an adjustable gage for said waxer adapted to limit the approach of the work to said trimmer and waxer respectively, said gages defining rings displaceable longitudinally of the head, means maintaining one of the gages in follower engagement with the other gage, and means for adjusting the latter gage.

5. A combination tool comprising a head adapted to be mounted upon a rotatable drive shaft, a trimmer and a waxer located at spaced intervals along said head, said trimmer comprising a series of cutting blades circumferentially spaced about the head, and said waxer comprising a friction cylinder located adjacent said trimmer, an adjustable gage for said trimmer and an adjustable gage for said waxer adapted to limit the approach of the work to said trimmer and waxer respectively, said gages defining rings displaceable longitudinally of the head, a spring yieldingly pressing one of the rings into engagement with the other ring, and means for adjusting the former ring to correspondingly adjust the latter ring.

6. A combination tool comprising a head adapted to be mounted upon a rotatable drive shaft, a trimmer and a waxer located at spaced intervals along said head, said trimmer comprising a series of cutting blades circumferentially spaced about the head, and said waxer comprising a friction cylinder located adjacent said trimmer, an adjustable gage for said trimmer and an adjustable gage for said waxer adapted to limit the approach of the work to said trimmer and waxer respectively, said gages defining a pair of rings, the trimmer gage being slidably disposed within a recess in the end of the head and the waxer gage encircling the shaft and having means for adjusting it therealong, and a spring for yieldingly maintaining the trimmer gage in engagement with the waxer gage.

PAUL WARD.